United States Patent [19]

Baer

[11] Patent Number: 4,832,001
[45] Date of Patent: May 23, 1989

[54] LIGHTWEIGHT SOLAR PANEL SUPPORT

[75] Inventor: Stephen C. Baer, Albuquerque, N. Mex.

[73] Assignee: Zomeworks Corporation, Albuquerque, N. Mex.

[21] Appl. No.: 55,214

[22] Filed: May 28, 1987

[51] Int. Cl.[4] .............................................. F24J 3/02
[52] U.S. Cl. .................................... 126/425; 126/424; 136/246
[58] Field of Search ............... 126/438, 424, 435, 417; 135/90, 87, 104; 52/83; 353/3; 136/246

[56] References Cited

U.S. PATENT DOCUMENTS

| 41,418 | 2/1864 | Abbott | 135/90 X |
|---|---|---|---|
| 209,275 | 10/1878 | Leycester | 135/90 X |
| 3,035,591 | 5/1962 | Patten | 135/90 X |
| 4,078,549 | 3/1975 | McKeen et al. | 126/425 X |
| 4,315,500 | 2/1982 | Gonder | 126/425 |
| 4,466,423 | 8/1984 | Dolan et al. | 126/425 X |

FOREIGN PATENT DOCUMENTS

| 2449852 | 10/1980 | France | 126/424 |
|---|---|---|---|
| 9083 | 6/1901 | United Kingdom | 135/87 |

Primary Examiner—Samuel Scott
Assistant Examiner—Carl D. Price
Attorney, Agent, or Firm—Townsend & Townsend

[57] ABSTRACT

A lightweight support for one or more solar panels is disclosed. A compression frame is mounted to the supporting surface, and tension members extend laterally from the frame in opposite directions to the supporting surface. The solar panels are attached to one of the tension members in a fashion which allows the solar panel to rotate and so that the panels can follow the sun throughout the day.

12 Claims, 2 Drawing Sheets

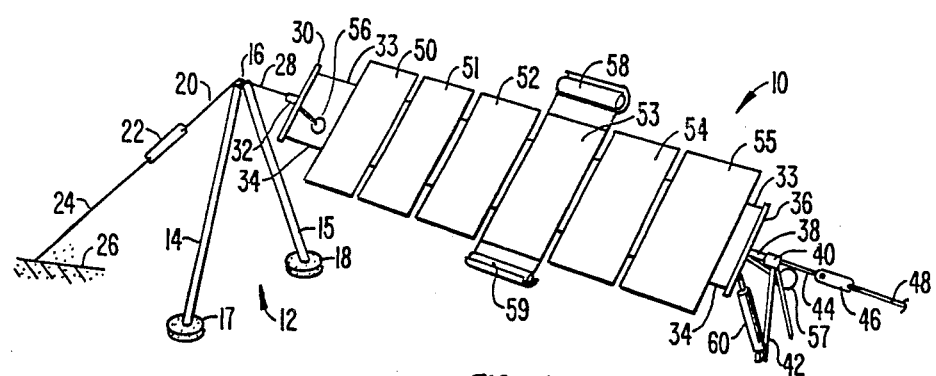
FIG._1.
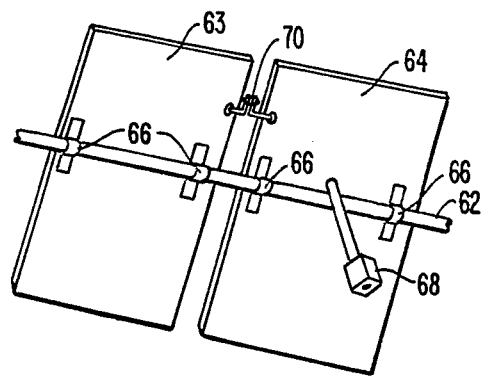
FIG._2.
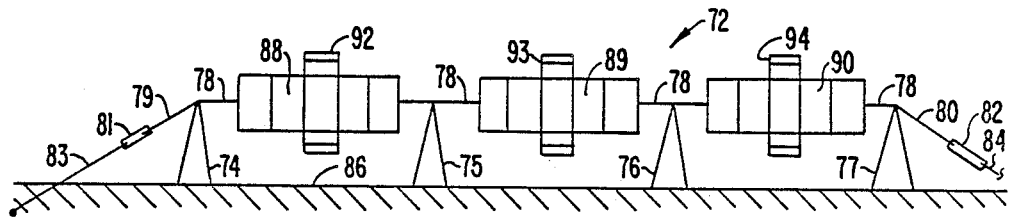
FIG._3.

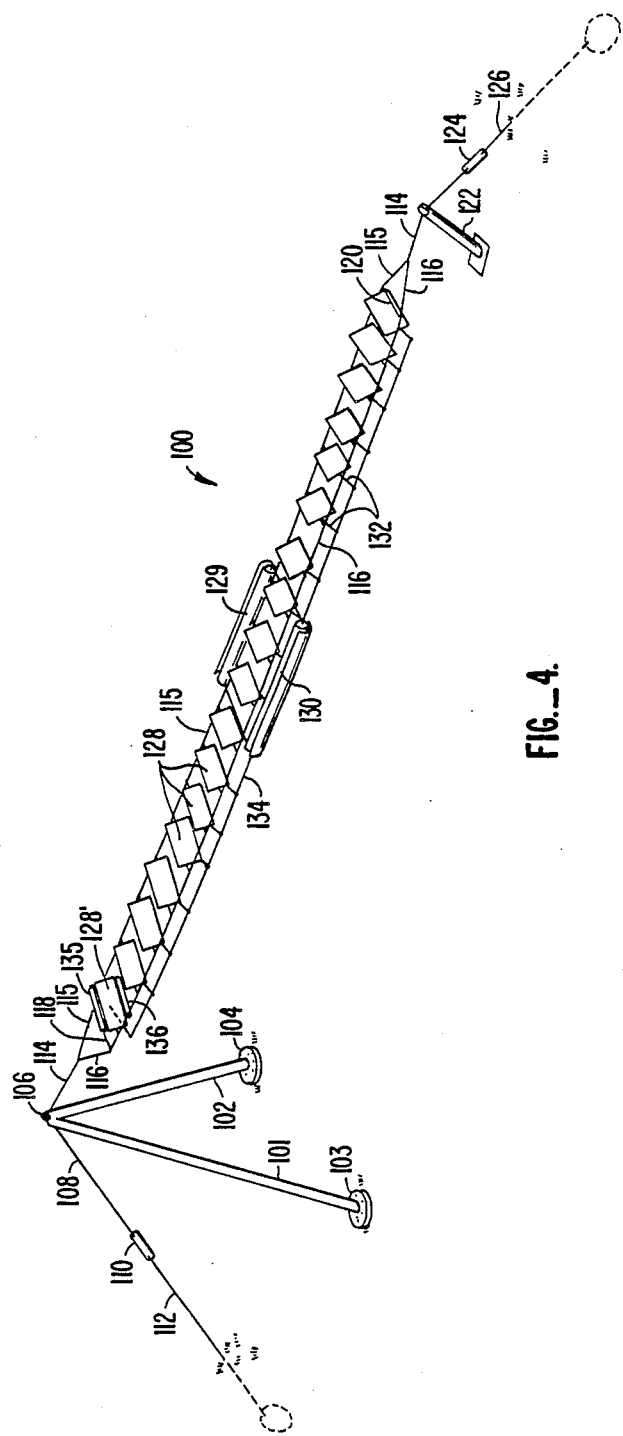
FIG._4.

LIGHTWEIGHT SOLAR PANEL SUPPORT

BACKGROUND OF THE INVENTION

The present invention relates to a support for solar panels, and in particular to a lightweight support which minimizes the use of heavy structural steel even in a large solar panel installation.

Solar panels containing an array of photovoltaic cells which generate electricity have been found very useful in supplying electric power in remote locations. For example, photovoltaic solar panels now provide electrical power to wells, pipeline pumping stations, and the like. Such applications all involve the use of electrical energy in a location far from conventional sources.

The efficiency of such solar panel installations has been greatly increased by using solar tracking mechanisms, such as those illustrated in U.S. Pat. Nos. 4,275,712 and 4,476,854, which rotate the solar panels to face the sun as it moves through the sky. Because of the success of such installations, solar generated electricity is being used in larger and larger applications, and the size of the solar panel arrays is rapidly increasing.

The typical support for a solar panel array which tracks the sun employs a large pedestal embedded in cement, and a rigid torque tube assembly which provides a rectangular frame on which the solar panels are mounted. As the size of the solar panel array increases, the size and weight of the frame for the panels increases geometrically. A heavy structural steel pedestal is required, embedded in a large cement base to withstand the loads on the above ground structure. Typical installations have become sufficiently large so that cranes are required to move and install the structural steel, and cement trucked in to support the steel framework. Unfortunately, the construction of such a large support structure is quite expensive and difficult in the typical remote locations where such solar panel installations are most advantageous.

SUMMARY OF THE INVENTION

The present invention provides a lightweight support for one or more solar panels. A compression frame is mounted to the supporting surface, and tension members extend laterally from the frame in opposite directions to the supporting surface. The solar panels are attached to one of the tension members in a fashion which allows the solar panel to rotate so that the panels can follow the sun throughout the day.

In a preferred embodiment of the present invention, the tension member on which the solar panels are located includes a pair of parallel members, with the solar panels spanning the parallel members. The parallel members rotate in unison so that the panels follow the sun throughout the day. In most installations, the tension member on which the solar panels are mounted will have a north/south orientation, and a sun sensor will orient the solar panels toward the sun. In addition, a sun sensor can be employed to pivot the solar panels about east/west axes so that the panels directly face the sun as its declination changes.

Prior art solar panel supports need large structural steel because the basic structural elements of the support, principally the pedestal and torque tubes, are subjected to large bending loads. The present invention provides a structure in which the support elements act either in compression or tension, and bending loads are minimized. Relatively inexpensive and lightweight pipes can be used as the compression members, with cables, rods or tubes (either round or square) used as the tension members. Rather than a large concrete base, only small concrete pads are needed to support the compression members, and the tension members can be secured to the ground using conventional helical anchors. The structural elements required for the support of the present invention are thus lightweight and easily transportable even to a remote location.

The novel features which are characteristic of the invention, as to organization and method of operation, together with further objects and advantages thereof will be better understood from the following description considered in connection with the accompanying drawings in which preferred embodiments of the invention are illustrated by way of example. It is to be expressly understood, however, that the drawings are for the purpose of illustration and description only and are not intended as a definition of the limits of the invention.

BRIEF DESCRIPTION OF THE DRAWINGS

FIG. 1 is a perspective view of a first embodiment of the present invention.

FIG. 2 is a fragmentary perspective view from beneath the solar panels of an alternate embodiment of the present invention;

FIG. 3 is a schematic elevation view of a third embodiment of the present invention;

FIG. 4 is a perspective view of a fourth embodiment of the present invention.

DESCRIPTION OF THE PREFERRED EMBODIMENT

A solar panel support 10 illustrating a first embodiment of the present invention is depicted in FIG. 1. Support 10 includes an A-frame 12 comprising first and second pipes 14, 15 welded or otherwise joined at an apex 16. Pipes 14, 15 of A-frame 12 are mounted on small concrete pads 17, 18 on a supporting surface, typically the ground. Pads 17, 18 merely prevent pipes 15, 16 from sinking into the ground or shifting position, and need not be large or deep because they do not have to support bending forces. A cable 20 extends laterally from the apex 16 of A-frame 12, and joins turn buckle 22. Another cable 24 extends from turn buckle 22 and is secured by a helical anchor or other conventional anchoring mechanism to supporting surface 26.

A second cable 28 extends from apex 16 of A-frame 12 in the opposite direction from that of cable 20. Cable 28 is joined to a cross member 30 by a thrust bearing 32 which allows the cross member to rotate relative to cable 28. A pair of parallel cables 33, 34 extend from cross member 30 to a second cross member 36. A pipe segment 38 joins cross member 36 to a second thrust bearing 40, mounted on a second A-frame 42. A cable 44, turn buckle 46 and cable 48 extend to the supporting surface where cable 48 is attached by a conventional helical anchor or other appropriate support. Cables 20 and 44 apply a continuous tension force on parallel cables 33, 34, placing a compression load on A-frame 12. Essentially no bending forces are exerted on any of the main structural elements.

A plurality of solar panels 50–55 are mounted to parallel cables 33, 34. Thrust bearings 32, 40 allow parallel cables 33, 34 to rotate about an axis between them. Alternatively, cable 28 could be of sufficient length and pipe section 38 replaced with a cable of sufficient length, so that the twisting allowed by the cables themselves would accommodate the desired rotation of solar panels 50–55. Counterweights 56, 57 balance the weight of solar panels 50–55 to allow free rotation of the panels.

A sun sensor, such as that provided by shaded and interconnected Freon canisters 58, 59 (see U.S. Pat. Nos. 4,275,712 and 4,476,854) insures that the panels follow the sun during the day. Canisters 58, 59 are shaded so that the cylinders receive equal sunshine when solar panels 50–55 are pointed at the plane of the sun. If the solar panel is not in the plane of the sun, the far canister will be heated more than the heat canister. The volatile Freon in the cylinders will flow from the far canister, which has been heated to a greater extent than the near canister, to the near canister, raising the weight of the near canister. The solar panel turns until it is again facing the sun and the heating of the two canisters is again uniform.

Except for equatorial installations, parallel cables 33, 34 are generally aligned in a north/south direction so that the solar panels follow the sun from sunrise to sunset. In embodiment 10, parallel cables 33, 34 are inclined to horizontal to point solar panels 50–55 to the average declination of the sun. In equitorial installations, A-frame 12 and 42 will be the same height, and cables 33, 34 will be horizontal. A shock absorber 60 extends from one foot of A-frame 42 to second cross member 36 to stabilize the rotation of solar panels 50–55 against wind gusts and other environmental factors.

A simplified embodiment of the present invention is illustrated in FIG. 2, where cross members 30, 36 and parallel cables 33, 34 are replaced by a single cable 62. Solar panel 63, 64 are mounted to cable 62 by means of bearings 66 which allow rotation of the solar panel relative to cable 62. A counterweight 68 is attached to panel 64, and the solar panels are coupled by a flexible linkage 70 so that the panels rotate in unison. The flexibility of linkage 70 allows the panels to rotate in unison even though there will be certain amount of sag in cable 62 and the panels will not rotate about exactly the same axis.

A third embodiment 72 of the present invention is illustrated by way of reference to FIG. 3. Embodiment 72 is particularly adapted to installations near the equator where the relative declination of the sun (angle of inclination of the sun from directly overhead) is near zero, or where other considerations dominate and the declination of the sun can be ignored. Embodiment 72 includes a plurality of A-frames 74–77, and a single cable 78 connecting the apexes of the A-frames. Cables 79, 80 extend in opposite directions from A-frames 74, 77, and are coupled by turn buckles 81, 82 and cables 83, 84 to the supporting surface 86. Sets of solar panels 88–90, each with a sun sensor 92–94, are mounted to cable 78 in the manner illustrated in FIG. 2 to allow the solar panels to track the sun as the sun moves through the sky during the day. As with the previous embodiments, cable 78 is maintained in tension by cables 79, 80 with A-frames 74–77 being in compression. The entire structure can thus be composed of very lightweight elements, with cables and turn buckles as the compression members and relatively thin pipes used to construct A-frames 74–77.

An embodiment 100 of the present invention adapted to compensate for the declination of the sun, and in particular the manner in which the declination changes throughout the day, is illustrated in FIG. 4. As with the previous embodiments, embodiment 100 includes a compression frame comprising a pair of pipes 101, 102 mounted on relatively small concrete pads 103, 104 and meeting at an apex 106. A cable 108 extends from apex 106 to a turn buckle 110, which is in turn coupled to a cable 112 which is anchored to the ground by a helical anchor or other suitable conventional device. Another cable 114 extends from apex 106 in the opposite direction from that of cable 108. Cable 114 divides into a pair of parallel cables 115, 116 separated by a cross member 118 at one end and a cross member 120 at the other. A smaller compression frame 122 supports the far end of cable 114, which is anchored to the ground by turn buckle 124 and anchored cable 126.

The length of the ends of cable 114 is sufficient to allow the parallel cable elements 115, 116 to rotate about an axis between them. A plurality of solar panels 128 are located intermediate cable element 115, 116 and are pivotably attached to the cable elements so that they are pivotable about their transverse axis. A sun sensor including a connected pair of shaded Freon canisters 129, 130 position cable elements 115, 116 so that solar panels 128 face toward the sun as it moves through the sky during the day.

A hanger 132 depends from each solar panel 128, and the hangers 132 are interconnected by a series of rods 134. The attachment of the ends of hangers 132 to rods 134 can be adjusted so that each of the solar panels 128 point directly at the sun at all times, even though there will be a significant amount of sag in cable elements 115, 116. An intermediate cross member and support can be included to reduce the sag in cable elements 115, 116 if desired.

One of the solar panels 128' has a sun sensor attached to it including joined shaded Freon canisters 135, 136, which operates in the same fashion as canisters 58, 59. Canisters 135, 136 pivot solar panel 128, so that it points directly at the sun. Pivoting solar panels 128 about the transverse axis accounts for changes in declination of the sun, both during the day and from season to season. Because the respective hangers 132 depending from the remaining solar panels 128 are interconnected by rods 134, the solar panels pivot in unison and all face directly at the sun.

In the embodiment of FIG. 4, interconnected shaded Freon canisters 129, 130 and 135, 136 are utilized to face the solar panels toward the sun. Typically, cable 114 is oriented in a north/south direction, with canisters 129, 130 accounting for east/west movement of the sun during the day. Canisters 135, 136 cause solar panels 128 to pivot in a north/south direction (i.e., about their east/west axis) to account for changes in solar declination. Other types of sun sensors, and alternate pointing mechanisms such as timers, can be used as well, with the support of the present invention.

Each of the embodiments demonstrates a common principle, namely, the use of supports in which the structural elements act under essentially pure compression or pure tension. None of the structural members encounters any significant bending stresses, thus greatly minimizing the size and weight of the elements required to support the solar panels. While simple and lightweight, however, the support provided by the present invention achieves the same objectives satisfied by much more massive and expensive pedestal type structures. Specifically, the solar panels are allowed to freely track the sun, and even the orthogonal movement found in rigid supports can be provided to fully accommodate the movement of the sun.

While preferred embodiments of the present invention have been illustrated in detail, it is apparent that modifications and adaptations of those embodiments will occur to those skilled in the art. However, it is to be expressly understood that such modifications and adaptations are within the spirit and scope of the present invention, as set forth in the following claims.

What is claimed is:

1. A lightweight support for a solar panel which suspends the panel above a supporting surface, said support comprising:
    a compression frame adapted to be mounted to the supporting surface;
    a first tension means for supporting the solar panel extending from the frame to the supporting surface;
    a second tension means for supporting the solar panel extending from the frame in a direction opposite from that of the first tension means, said second tension means including first and second cross members, a pair of parallel members attached at spaced apart locations to the first and second cross members, and first and second single cables attached to the first and second cross members, the first single cable being attached to the compression frame and the second single cable being secured to the supporting surface, the single cables being twistable to allow rotation of the parallel members relative to the supporting surface;
    means for attaching the solar panel to the parallel members of the second tension means; and
    means for rotating the parallel members of the second tension means so that said solar panel faces the sun as the sun moves relative to the supporting surface, said rotating means including a pair of spaced apart interconnected cylinders mounted to the parallel members of the second tension means, means for shading the outer portions of the cylinders so that the cylinders receive equal sunshine when the solar panel is directly facing the sun and unequal sunshine when the solar panel is not directly facing the sun, and a volatile liquid in the cylinders which flows into the cooler cylinder when the cylinders are unequally heated by the sun to rotate the parallel members until the solar panel faces the sun and the cylinders are equally heated.

2. The support of claim 1 wherein the compression frame comprise a pair of rigid members in a common plain.

3. The support of claim 1 wherein the compression frame comprises a pair of pipe members extending upwardly from the supporting surface and meeting at an apex, with the first and second tension means extending in different lateral directions from the apex.

4. The support of claim 1 wherein the first tension means comprises a cable.

5. The support of claim 1 wherein the second tension means is inclined at an acute angle to horizontal.

6. The support of claim 1 and additionally comprising a second compression frame attached to said other twistable member, and a third tension means secured to the supporting surface to secure said other twistable member to said surface.

7. The support of claim 1 and additionally comprising damper means connected to one of the cross members stabilize the rotation of the solar panel.

8. The support of claim 1 and additionally comprising a second solar panel mounted to the second tension means in tandem with the first solar panel.

9. A lightweight support for a solar panel which suspends the panel above a supporting surface, said support comprising:
    first and second compression frames adapted to be mounted to the supporting surface;
    a first tension means for supporting the solar panel extending from the first compression frame to the supporting surface;
    a second tension means for supporting the solar panel extending from the first compression frame to the second compression frame, said second tension means including first and second cross members, a pair of parallel members attached at spaced apart locations to the first and second cross members, and first and second single cables attached to the first and second cross members, the first single cable being attached to the first compression frame and the second single cable being attached to the second compression frame, the single cables being twistable to allow rotation of the parallel members relative to the supporting surface;
    a third tension means extending from the second compression frame to the supporting surface in a direction opposite from that of the first tension means;
    means for attaching the solar panel to the parallel members of the second tension means; and
    means for rotating the parallel members of the second tension means so that said solar panel faces the sun as the sun moves relative to the supporting surface, said rotating means including a pair of spaced apart interconnected cylinders mounted to the parallel members of the second tension means, means for shading he outer portions of the cylinders so that the cylinders receive equal sunshine when the solar panel is directing facing the sun and unequal sunshine when the solar panel is not directly facing the sun, and a volatile liquid in the cylinders which flows into the cooler cylinder when the cylinders are unequally heated by the sun to rotate the parallel members until the solar panel faces the sun and the cylinders are equally heated.

10. The support of claim 9 wherein the first and second compression frames comprise a pair of rigid members in a common plain.

11. The support of claim 9 wherein the first and second compression frames each comprise a pair of pipe members extending upwardly from the supporting surface and meeting at an apex, with the first and third tension means extending in different directions from the apexes of the first and second compression frames respectively.

12. The support of claim 9 wherein the first and third tension means each comprise a cable.

* * * * *